Sept. 25, 1962     E. J. ANDERSON     3,055,281
SHUTTER AND OPERATING MECHANISM THEREFOR
Filed Oct. 29, 1959     2 Sheets-Sheet 1

INVENTOR.
Einar J. Anderson
BY
ATTORNEY.

Sept. 25, 1962   E. J. ANDERSON   3,055,281
SHUTTER AND OPERATING MECHANISM THEREFOR
Filed Oct. 29, 1959   2 Sheets-Sheet 2
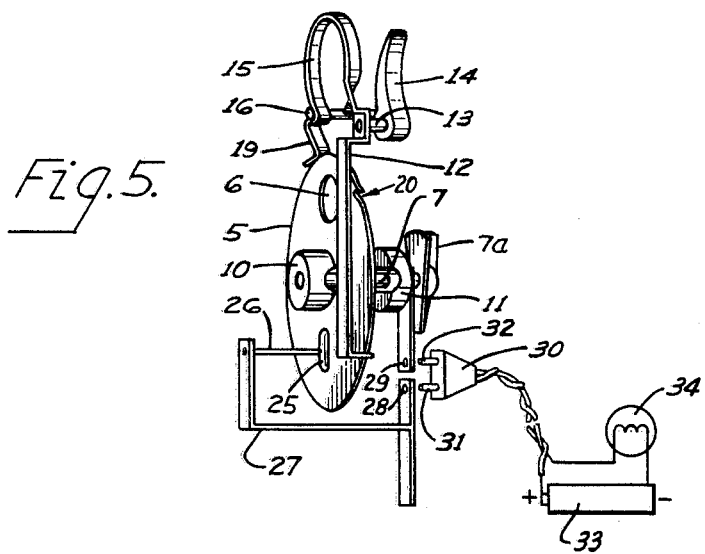
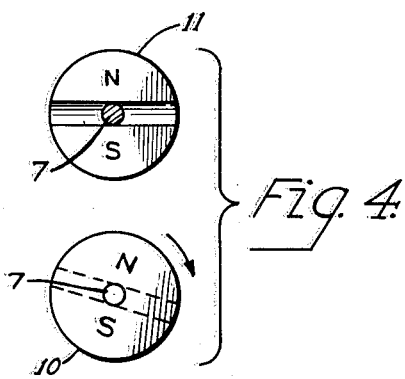
INVENTOR.
Einar J. Anderson
BY
John H. Leonard,
his ATTORNEY.

United States Patent Office 3,055,281
Patented Sept. 25, 1962

3,055,281
SHUTTER AND OPERATING MECHANISM
THEREFOR
Einar J. Anderson, 1575 Sheffield Road,
South Euclid, Ohio
Filed Oct. 29, 1959, Ser. No. 849,636
6 Claims. (Cl. 95—59)

This invention relates generally to a device for permitting and arresting the transmission of direct or reflected rays from a source to an objective, and for controlling the duration of the periods of exposure of the objective thereto, selectively.

More specifically, the invention relates to a device for controlling the transmission of direct or reflected light rays from a source to a sensitive plate in a camera, and for controlling the time of exposure of the plate to the rays.

For the purposes of illustration, the present invention is described herein as applied to a convention photographic camera of the portable type, wherein certain problems are presented which are more pronounced than in the case of equipment which is used in protected locations, such as laboratories and the like. The use of the invention with other types of equipment such as X-ray machines, spectrographic equipment, and the like, will be readily apparent from the illustrative example. In the use of portable cameras, the cameras generally are exposed to widely varying weather conditions, particularly to widely varying temperatures and moisture conditions, and, in operation often are tilted into various positions.

Heretofore, cameras of this nature have been provided with spring operated shutters. In shutters of this type, there are mechanical sliding surfaces and the like which are apt to become contaminated with foreign matter which interferes with the designed shutter operation. Also, the operations of the springs and accessory equipment are adversely affected by extremely low temperatures, particularly when accompanied by moisture. Changes in temperature cause a corresponding change in the restorative power of the springs as a result of which, and as a result of other frictional stresses which are caused to vary by changes in temperature, the rapidity of operation of the shutter for a given setting varies with temperature changes.

Most prior cameras are designed so that the operating mechanism and shutter are balanced in one particular position in which the camera is customarily used. Consequently, a change from the normal operating position adversely effects the balance and causes erratic operation of the shutter.

Another disadvantage of prior shutters and operating mechanisms is that they cause vibration of the cameras during operation, and in many instances such as celestial photography and other precise photographic work, this vibration causes blurring and indistinctness in the image and resultant photograph.

Furthermore, in prior cameras two steps are necessary to prepare the camera for picture taking, one being the setting of the shutter speed and the other, as a separate and distinct step, the cocking of the shutter operating mechanism.

An object of the present invention is to provide a simple and effective shutter and operating mechanism for controlling the transmission of light rays, and which shutter and mechanism are not adversely effected by the usual weather and temperature conditions and changes in temperature.

Another object is to reduce to a minimum the relatively moving parts of the shutter and operating and control mechanism therefor so that with a minimum number of parts and movements, accurate control of the time of exposure can be obtained.

More specific objects are to provide a shutter comprising a single rotating element which is operated directly by the coercive force of permanently magnetic means movable with and relative to the shutter, respectively, from any one of a number of preselected positions to and beyond the position for effecting the exposure, and to provide a simple and effective mechanism for setting the shutter and its operating mechanism for predetermined times of exposure, and for releasing the shutter and its mechanism for operation.

Another specific object is to provide a shutter mechanism and operating mechanism so arranged that the shutter and mechanism operate smoothly without imparting vibrations to the camera.

Another important object is to provide a shutter and operating mechanism wherein the setting of the shutter speed of itself cocks the mechanism in condition for operating the shutter when the mechanism is released.

Other objects and advantages of the invention will become apparent from the following description wherein reference is made to the drawings.

FIG. 4 is a diagramamtic illustration of the permanent magnets of the present device showing them in their relative positions when the shutter is in a starting position for a 1/100 of a second exposure.

FIG. 5 is a diagrammatic illustration of the shutter, magnets, and latching mechanism with means for operating a photoflash bulb at the instant of exposure.

Figure 1:
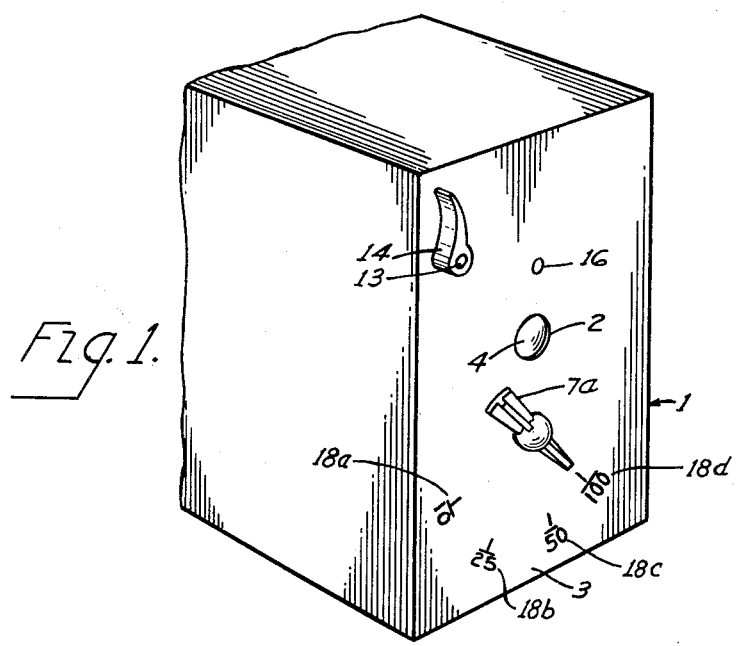
FIG. 1 is a fragmentary perspective view of a conventional box-type camera in which the present invention is incorporated.

Referring to the drawings, the camera comprises the usual box structure 1 having an aperture 2 in the front thereof and adapted to support interiorly at the rear a film of the conventional type. The camera is shown, for illustration, as having a front wall 3 in which is supported the usual objective lens 4 through which pass the rays which are to be controlled by the shutter device of the present invention. For interrupting and permitting the passage of direct or reflected rays from a source through the lens to the objective or film within the camera, a shutter 5 is provided.

The shutter 5 preferably comprises a simple disc having therein an aperture 6. The disc is mounted on a suitable shaft 7 for rotation therewith about the shaft axis. For mounting the shutter for rotation in this manner, the shaft 7 extends through the front wall 3 and has a manually operating knob 7a. The aperture 6 of the shutter 5 is spaced radially outwardly from the axis of the shaft 7 so that, upon rotation of the shutter about the axis of the shaft, the aperture 6 can pass into and out of alignment with the objective lens 4 of the camera.

The shaft 7 may be rotatably mounted in a light sealing bearing in the magnet 11 and front wall 3 for rotation and axial sliding movement. If desired, the inner end of the shaft 6 may extend beyond the magnet 10 and be slidably received in a bearing on an inner light sealing wall 8 which is parallel to and spaced rearwardly from the wall 3.

The knob 7a rotates with the shaft 7 and thereby can rotate the shutter manually to preselected positions for purposes later to be described.

In order to rotate the shutter 5 for effective exposures of the plate, permanently magnetic means are provided. In the form illustrated, the permanently magnetic means comprise permanent magnets 10 and 11. Magnet 10 is secured to the shaft 7 and shutter 5 for rotation therewith, and the magnet 11 is fixedly connected to the front wall 3. Preferably, the permanent magnets are bi-polar magnets, although magnets with a greater number of poles may be used if desired. The magnet 10 is secured to the shaft 7 and shutter 5 with its pole faces facing toward the pole faces of the magnet 11, the pole faces of the two magnets normally being spaced apart from each other in a direction endwise of the shaft 7. The magnet 11 is secured to the front wall 3 with its pole faces extending rearwardly and facing toward the shutter. In most positions of the shutter, the pole faces of the magnet 10 are spaced apart circumferentially of the shaft 7 from those of the magnet 11. If desired, the shaft 7 may be mounted for slight endwise movement so that the magnets are held apart by their inherent mutual repulsion due to partial alignment of like pole faces in some positions. As unlike pole faces become aligned and hence mutually attractive, the magnets urge the shaft endwise and finally, when unlike pole faces are fully aligned, into a position in which the unlike pole faces come into contact and stop rotation of the shutter.

Figures 2, 3:
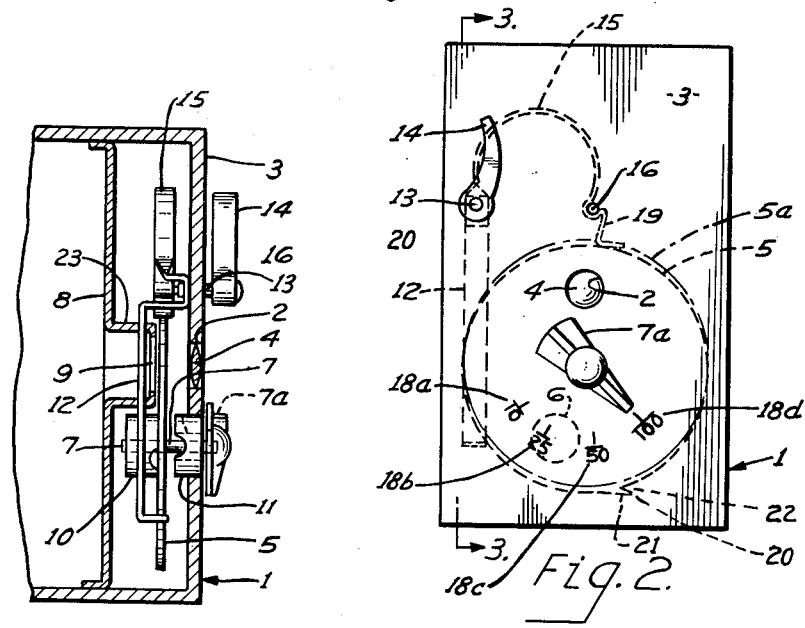
FIG. 2 is a front elevation of the camera illustrated in FIG. 1.
FIG. 3 is a vertical longitudinal sectional view of the camera taken on a line 3—3 in FIG. 2.

If the magnets are bi-polar, the north pole and the south pole of each is positioned diametrically opposite from each other with respect to the shaft. These magnets are normally arranged in relatively rotated positions about the axis of the shaft 7 so that when the shutter is in starting position for a 1/100 of a second exposure, the north poles are adjacent to each other. The north pole of the magnet on the shutter is then in a rotated position just beyond the north pole of the stationary magnet, in the direction of rotation of the shutter for effecting exposure, which direction is clockwise in FIGURES 2 and 4. The shutter can be rotated from any position of rest to any one of a number of preselected starting positions by rotating the knob 7a.

In order to hold the shutter in a preselected one of the starting or rest positions, a suitable latching device is provided. This latching device comprises a shutter contact bar 12 connected to rock shaft 13 which in turn extends through a light sealing bearing outwardly forwardly of the wall 3.

On the outer end of the shaft 13 is an operating lever 14 which may be moved by the operator of the camera for releasing the shutter contact bar 12 from frictional engagement with shutter 5. A spring 15 is connected at one end in fixed position relative to the front wall by means of a suitable anchoring pin 16, and the other end is connected to the shaft 13 for effecting rotation of the shaft in a direction to apply the outer end of the shutter contact bar 12 frictionally, but firmly, against the edge of the shutter 5 for latching the shutter in preselected positions. If desired, the shutter contact bar 12 can be made as an integral portion of the spring 15.

The strength of the spring 15 is such that in any rotated position of the shutter 5, the frictional engagement of the shutter contact bar 12 with the edge of the shutter can prevent starting of rotation of the shutter by the permanent magnets 10 and 11.

The starting position of the shutter is such that the aperture 6 is out of alignment with the objective lens 4. For example, the aperture 6 may be a predetermined number of degrees in advance of the lens 4. In order to set the camera for the particular time of exposure required, the knob 7a is rotated while the bar 12 remains in frictional sliding engagement with the disc or shutter.

On the front of the wall 3 are provided a number of indications or indicia 18a, 18b, 18c and 18d, for example, each of which indicates the length of time of exposure which will result from setting of the knob 7a when it is pointing to the particular one of the indicia. It is to be noted that when the knob is moved to any one of these starting positions, the shutter is rotated to a selectively predetermined position wherein the like poles of the magnets are circumferentially positioned in such manner that the direction of rotation of the shutter resulting from their coercive forces will be in the clockwise direction in FIGS. 1 and 2.

The farther the aperture 6 is from alignment with the lens 4 in the starting position, the more rapid is the time of exposure inasmuch as the greater distance of rotation of the shutter 5 permits it to gain speed so that the aperture 6 passes the lens 4 at greater speed as the result of longer travel and the greater magnetic attraction created by the approaching proximity of the opposite poles.

One end of the spring 15 is provided with a catch portion 19 which is resilient and which is disposed near the periphery of the shutter 5. The shutter 5 is provided with a ratchet notch 20 which opens through the periphery thereof and which is arranged so that it can receive the catch 19 when the two are aligned with each other. The ratchet notch 20 provides a relatively steep shoulder 21 which extends outwardly of the periphery beyond the greatest radius of shutter 5 and a sloping shoulder 22. Thus upon rotation of the disc 5 in the clockwise direction in FIG. 2, the catch 19 may be disengaged from the slot 20 by continuous clocwise rotation of the disc 5. However, upon rotation of the disc in the opposite direction, the catch 19 engages the more abrupt shoulder 21 and latches the shutter 5 against rotation in a counter-clockwise direction after the shutter has passed into and beyond exposure position. Thus, the catch 19 and notch 20 cooperate to prevent swinging of the shoulder beyond a predetermined position in the counter-clockwise direction by the permanent magnets after the exposure has been effected or by rotating the knob 7a in the wrong direction.

The wall 8 closes off the front portion of the camera in which the shutter and its operating mechanism are located. In order to dispose the aperture 9 close to, and substantially juxtaposed the inner face of the shutter 5, a forward protuberance 23 is formed on the wall 8 and the aperture 9 is located therein. If desired, the usual light screening felt may be interposed on the forward face of the protuberance, in surrounding relation to the aperture 9, and juxtaposed slidably against the rear face of the shutter for preventing any possible light leaks.

Here it should be noted that the manipulation of the knob 7a to set shutter speed also cocks the shutter operating mechanism.

In operation of the shutter device thus described, with the bar 12 held by the spring 15 into frictional engagement with the edge of the shutter 5, the shutter is in a rest position in which the aperture 6 is out of alignment with the objective lens 4. The knob 7a is then rotated so that it points to the preselected one of the starting positions 18a, 18b, 18c and 18d. In the rest position, the shutter is ready for operation and the unlike poles of the magnets are approximately aligned with each other circumferentially of the shaft 7 but slightly misaligned in a direction to urge the shutter in the clockwise direction when viewed from the front of the camera. In order to make an exposure, all that is necessary is to actuate or raise the lever 14 and thus swing the bar 12 free from the shutter, whereupon the permanent magnets cause the shutter to rotate in a clockwise direction until the aperture 6 has passed the objective 4.

Since the removal of metal to provide the aperture 6 and notch 20 reduces the weight of the shutter sector in which the aperture and notch are located, the shutter may be unbalanced so that its speed may vary slightly, depending on the position of the camera. To compensate for this unbalance, the shutter is mounted on the shaft 7 in slightly eccentric relation to the shaft axis, the shaft axis being disposed of the shutter at approximately the center of gravity. Thus the shutter is eccentric to the shaft axis, but its center of gravity is brought into coincidence with the axis of the shaft. This eccentric mounting has an additional advantage in that, before rotation of the shutter from starting position, its periphery can firmly frictionally engage the contact bar 12, but as the shutter rotates to exposure position, its periphery recedes from the point of engagement with the contact bar 12, thus preventing frictional drag of the bar 12 against the shutter even though the bar 12 is freed and has returned to its starting position. On the other hand, the periphery approaches the bar 12 as the shutter continues to rotate in the same direction after the aperture 6 has passed exposure position. Said described shutter operation is indicated by the dash line 5a in FIG. 2.

In some instances, it is desired to use flash bulb connections in combination with the shutter. For this purpose, as best illustrated in FIG. 5, the shutter is provided with a raised boss 25. A suitable support is mounted in the camera and carries a sliding contact 26 positioned so that it is engaged by the boss in one predetermined position of the boss. The contact 26 is connected by a supporting bus bar 27 to one terminal 28 of a plug-in receptacle. The other terminal 29 of the plug-in receptacle is connected through the shaft 7 to the shutter 5 so as to provide an electric circuit from the contact 26 through the boss, shaft 7, to the receptacle terminal 28. A suitable plug 30 having saber arms 31 and 32 is adapted for connection with the receptacles 28 and 29, respectively, and completes the circuit through a battery 33 and a flashbulb 34 and its usual operating mechanism. The position of the contact 26 relative to the rotated position of the boss 25, if contact is to be made for a predetermined millisecond delay, may be slightly in advance of the alignment of the aperture 6 with the objective 4, so that the bulb is at full flash when the aperture is aligned with the lens. For this purpose, contact 26 may be positioned circumferentially of the shutter if desired.

It is apparent from the foregoing description that the shutter and its operating and control mechanism is exceedingly simple, and the speed of operation of the shutter is practically unaffected by extreme temperatures or extreme changes therein. Furthermore, since there are no relatively sliding parts in the operating mechanism when the shutter is being moved for an exposure, moisture and the like do not appreciably affect the operation. Furthermore, since the magnets can be of the alnico material and the shutter of a non-ferrous material, and since no parts need slide one upon the other for operation, the problem of corrosion and its deleterious effects on shutters for this purpose is entirely absent.

For purposes of X-ray use, the aperture 6 in the sense of a hole through the disc can be eliminated and, instead, the shutter is made of a shielding material or is coated with a shielding material, in which latter case the shielding material is omitted at the place where the aperture 6 now appears.

Having thus described my invention, I claim:

1. A shutter device for interrupting the passage of rays from a source to an objective and comprising a support, a rotatable shutter disc having a starting rotated position wherein it blocks the passage of rays from the source to the objective and active rotated positions wherein it permits the passage of rays from the source to the objective, means for rotatably supporting the shutter disc on the support, permanently magnetic means operative to rotate the shutter disc in one direction from said starting position to and beyond said active rotated positions, and continuously urging the shutter disc, when the shutter disc is held in starting position, to rotate in said direction from the starting position, said permanently magnetic means including a first permanent magnet means in fixed position relative to the shutter disc and rotatable therewith, a second permanent magnet means in fixed position on the support, each of said permanent magnet means having pole faces spaced from each other circumferentially of the axis of rotation of the shutter disc and disposed radially outwardly therefrom in a plane parallel to the shutter disc, the plane of the pole faces of the first permanent magnet means being parallel to, and in closely spaced relation to, the plane of the pole faces of the second permanent magnet means, the pole faces of the first permanent magnet means being spaced radially from said axis so that their path is alongside the pole faces of the second permanent magnet means, latch means normally constraining the shutter disc from movement from the starting position in said direction, and manually operable means to release the last mentioned latch means and thereby permit movement of the shutter disc by the permanently magnetic means in said direction from starting position to and beyond said active rotated positions, and settable means for rotating the shutter disc in said direction to different starting positions.

2. A shutter device according to claim 1 including additional means engageable with the shutter disc at its periphery, after the shutter disc has been rotated beyond said active rotated positions from starting position, to latch the shutter disc against rotation in the opposite direction.

3. A shutter device for interrupting the passage of rays from a source to an objective and comprising a rotatable shutter disc having a starting rotated position wherein it blocks the passage of rays from the source to the objective and active rotated positions wherein it permits the passage of rays from the source to the objective, means for supporting the shutter disc for rotation about its axis, permanently magnetic means operative to rotate the shutter disc in one direction from preselected starting rotated positions, manual means to rotate the shutter disc in said one direction to said different rotated starting positions, selectively, means to latch the shutter disc in any selected one of said starting positions against continued rotation in said direction, said starting positions being those at which the shutter disc is at different distances from said active rotated positions, and said permanently magnetic means being operative when the shutter disc is in any one of said rotated starting positions for continuously urging the shutter disc in said direction to and beyond said active rotated positions.

4. A device according to claim 1 wherein said first permanent magnet means is a magnet rotatable with the shutter and having at least one north pole and at least one south pole spaced from each other circumferentially of the axis of rotation, the support is spaced from the shutter disc, the second permanent magnet means is a permanent magnet mounted in fixed position on the support and has at least one north pole and one sorth pole spaced circumferentially of each other about said axis, said magnets having their poles positioned relative to each other circumferentially of the axis so that when the shutter disc is in starting position, like poles are sufficiently close to each other to repel each other and thereby urge the shutter disc in said direction toward active rotated positions.

5. The device according to claim 1 wherein the first permanent magnet means consists of a single permanent magnet rotatable with the shutter disc and having at least one north pole and at least one south pole symmetrically disposed with respect to the axis of rotation, the second permanent magnet means consists of a single permanent magnet having at least one north pole and one south pole symmetrically disposed about said axis and fixed in position on the support, said magnets having their poles positioned relative to each other circumferentially and radially of the axis so that they are sufficiently close to each other to repel each other and thereby urge the shutter disc in said direction toward active rotated positions.

6. A device according to claim 1 and including additionally, a shaft rotatably mounted in the support, said shutter disc being mounted on the shaft for rotation therewith, said settable means comprising a knob mounted on the shaft for rotating the shaft manually, and said pole faces of the permanent magnet means being positioned circumferentially of the shaft so that in the starting position of the shutter disc like pole faces of the first and second permanent magnet means are sufficiently close to each other so that the pole faces repel each other and thereby urge the shutter disc in said direction toward active rotated positions.

References Cited in the file of this patent

UNITED STATES PATENTS

| 386,449 | Bliss | July 24, 1888 |
| 2,391,377 | Aiken | Dec. 25, 1945 |
| 2,788,704 | Habig | Apr. 16, 1957 |

FOREIGN PATENTS

| 885,555 | France | May 31, 1943 |